(12) United States Patent
Kerkar et al.

(10) Patent No.: US 12,445,463 B2
(45) Date of Patent: Oct. 14, 2025

(54) MONITORING AND REMEDIATION OF SECURITY DRIFT EVENTS IN A PUBLIC CLOUD NETWORK

(71) Applicant: Salesforce, Inc., San Francisco, CA (US)

(72) Inventors: Neha Kerkar, Bellevue, WA (US); Prabhat Singh, San Jose, CA (US); Amit Chakrabarty, San Francisco, CA (US); Aditya Suresh Kumar, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 300 days.

(21) Appl. No.: 18/103,884

(22) Filed: Jan. 31, 2023

(65) Prior Publication Data

US 2024/0259396 A1   Aug. 1, 2024

(51) Int. Cl.
*H04L 29/06* (2006.01)
*H04L 9/40* (2022.01)

(52) U.S. Cl.
CPC .......... *H04L 63/1416* (2013.01); *H04L 63/20* (2013.01)

(58) Field of Classification Search
CPC .................................................. H04L 63/1416
USPC .......................................................... 726/23
See application file for complete search history.

(56) References Cited

U.S. PATENT DOCUMENTS

| | | | |
|---|---|---|---|
| 6,484,203 B1 * | 11/2002 | Porras | H04L 63/1408 709/224 |
| 2017/0214576 A1 * | 7/2017 | Pan | G06F 11/00 |
| 2022/0321842 A1 * | 10/2022 | Chavez | H04N 7/185 |
| 2023/0081915 A1 * | 3/2023 | Sawal | G06F 40/216 726/3 |

* cited by examiner

*Primary Examiner* — Jason K Gee
(74) *Attorney, Agent, or Firm* — Butzel Long

(57) ABSTRACT

A computer-implemented method for monitoring and remediating security drift in a public cloud network is disclosed. The security drift event includes an unintended change to existing security controls effected through an unauthorized deployment channel, performed by an unauthorized user. The method includes providing a cloud server application including a number of cloud client accounts, and deploying the cloud client accounts in client account clusters. The client account clusters include a master account that includes a drift detection component and a number of service accounts including serverless application components. The method further includes instantiating cloud infrastructure resources in the service accounts, and detecting a security drift event in the client account cluster, by the drift detection components. The method further includes, responsive to the security drift event, obtaining one or more remediation rules, and implementing a drift remediation strategy based on the one or more remediation rules, by a rules engine.

16 Claims, 8 Drawing Sheets

200 (continued)

214 — Providing a global account comprising a drift reporting component

216 — Collecting, by the drift reporting component, drift detection data across the client account clusters from the corresponding drift detection components

218 — Mapping, by the drift reporting component, the drift detection data to corresponding security breaching entities

222 — Configuring a serverless component in a service account as an account management agent

224 — Configuring serverless components in a service account as resource management agents

226 — Accepting API calls from the corresponding drift detection component, by the account management agent, and responsive to the API calls, triggering corresponding resource management agents

228 — Responsive to the triggers from the account management agent, executing one or more drift remediation strategies with respect to the corresponding cloud infrastructure resources

FIG. 2B

MONITORING AND REMEDIATION OF SECURITY DRIFT EVENTS IN A PUBLIC CLOUD NETWORK

BACKGROUND

The present disclosure relates to post-deployment monitoring and remediation of security drift events in a public cloud network. "Security drift events" occur when an untended change to security settings occurs due to unintended change to existing security controls by a security breaching entity. For example, when an unauthorized deployment channel and/or an unauthorized user attempts to change the identity and access permissions associated with a user account, the undesired change in permissions is an instance of a security drift.

Existing drift monitoring and remediation methods relate mostly to pre-deployment checks that involve considerable time delay between discovery and occurrence of drift and lack immediate remediation and effective notification. The issue of drift detection becomes harder to address as cloud service providers scale up their operations.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 2B is a flow diagram illustrating a method for monitoring and remediating security drift events in a public cloud network.

DETAILED DESCRIPTION

Figure 1A:
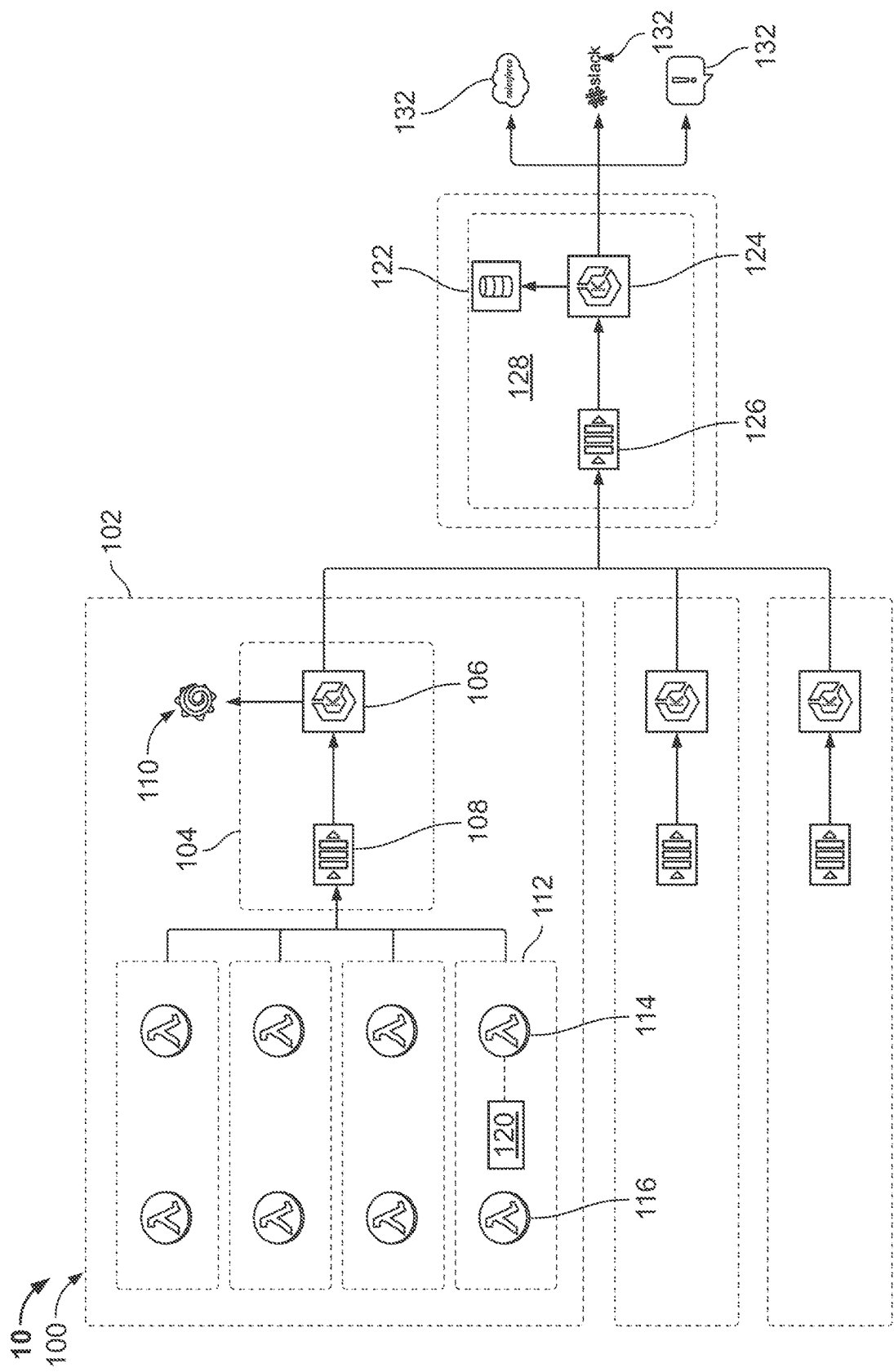
FIG. 1A is a block diagram illustrating an example system for monitoring and remediating security drift events in a public cloud network.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments of the present disclosure use serverless application components deployed across clusters of cloud client accounts, which interact directly with cloud infrastructure resources through API calls. The serverless components are monitored and controlled by drift detection components deployed across the cloud client accounts in a distributed architecture. The drift detection components configure the serverless components, collect drift detection data and forward the data to a globally instantiated drift reporting component. The drift reporting component maps the drift detection data to corresponding security breaching entities, stores the data in a database, and notifies remediation authorities through appropriate communication channels.

The serverless components, the drift detection components, and the drift reporting component of the present disclosure may provide a "lift-and-shift" architecture that allows for migration of the associated applications and data across multiple environments built over multiple substrates, such as Amazon Web Service (AWS), Google Cloud Platform (GCP), Microsoft Azure, and the like. As is commonly known in the art, the major considerations in a lift-and-shift architecture are the compute, storage, and network resources associated with a substrate and these resources are reconfigurable from a source substrate to a rehosting substrate. According to embodiments disclosed herein, when the associated applications and data are rehosted from a source substrate to a rehosting substrate, significant changes in the architecture, dataflow, or authentication mechanisms may not be required. As a result, there may be significant cost and complexity savings during any migration.

In an aspect of the disclosed subject matter, a computer-implemented method for monitoring and remediating security drift in a public cloud network is disclosed. The security drift event includes an unintended change to existing security controls effected through an unauthorized deployment channel, performed by an unauthorized user. The computer-implemented method may include providing a cloud server application that includes a number of cloud client accounts, and deploying the cloud client accounts in a number of client account clusters. The client account clusters include a master account that includes a drift detection component, and a number of service accounts that include serverless application components. The computer-implemented method may also include instantiating cloud infrastructure resources in the service accounts and detecting a security drift event in the client account cluster, by the drift detection components. The computer-implemented method may further include, responsive to the security drift event, obtaining one or more remediation rules and implementing a drift remediation strategy based on the one or more remediation rules, by a rules engine.

The computer-implemented method may include providing a global account that includes a drift reporting component, and collecting, by the drift reporting component, drift detection data across the client account clusters from the corresponding drift detection components. The computer-implemented method may include mapping, by the drift reporting component, the drift detection data to corresponding security breaching entities.

The computer-implemented method may include configuring a serverless component in a service account as an account management agent, and configuring a number of serverless components in a service account as resource management agents. The computer-implemented method may include accepting API calls from the corresponding drift detection component, by the account management agent, responsive to the API calls, triggering corresponding resource management agents, and responsive to the triggers from the account management agent, executing one or more drift remediation strategies with respect to the corresponding cloud infrastructure resources. The drift remediation strategies include at least one of an exception handling strategy, an automatic remediation strategy, a manual remediation strategy, and a deactivation strategy.

The computer-implemented method may include operating the serverless components with least privilege permissions specifying policies that govern changes in the corresponding cloud infrastructure resources, and confining, by the drift detection component, a drift radius of a security drift event to the corresponding client account cluster. The computer-implemented method may also include granularizing, by the drift detection component, a drift remediation strategy to a specific service account. The computer-implemented method may further include localizing, by the drift detection component, a drift remediation to a specific cloud infrastructure resource.

In an aspect of the disclosed subject matter, a system is disclosed for monitoring and remediating security drift in a public cloud network. The system includes one or more computer processors and a cloud server application digitally connected with the computer processors. The cloud server application includes a number of cloud client accounts deployed in a number of client account clusters. The client account clusters include a master account that includes a drift detection component configured to detect a security drift event in the client account cluster and a number of service accounts that include serverless application components. The system also includes a non-transitory machine-readable storage medium that provides instructions that are configurable to cause the system to perform any of the methods disclosed herein.

In an aspect of the disclosed subject matter, anon-transitory machine-readable storage medium is disclosed that includes instructions that, if executed by a processor, are configurable to cause said processor to perform operations and methods for monitoring and remediating security drift in a public cloud network.

FIG. 1A is a block diagram illustrating a system 10 for monitoring and remediating security drift events in a public cloud network. The security drift events, as used here, include an unintended change to existing security controls in a public cloud network, effected through a security breaching entity. The security breaching entity may be an unauthorized deployment channel, performed by an unauthorized user. The monitoring and remediating system 10 of FIG. TA includes a cloud server application 100 that deploys a number of cloud client accounts typically arranged in a number of client account clusters 102. The client account clusters 102 include a master account 104 that coordinates detection, monitoring and control of security drift events occurring in the entire client account clusters 102.

The master account 104 includes a drift detection component 106 configured to detect security drift events in the client account cluster 102 and a master service queue 108 for queuing the security drift events for notification and centralized logging. The client account clusters 102 include a number of service accounts 112. The service accounts 112 include several serverless application components that are locally-instantiated cloud infrastructure resources. The cloud infrastructure resources (also referred to as "resources") may be Elastic Compute Cloud (EC2) instances, security groups, ingress-egress rules, network access control lists (ACL), and the like. The serverless application components include several resource management agents 114 and an account management agent 116. An Identity and Access Management (IAM) role associated with the account management agent 116 registers the master account 104 as a trusted entity for detecting changes in a number of source files corresponding to the resource management agents 114. Further, responding to any change detected in the source files, the account management agent 116 may invoke corresponding resource management agents 114 via appropriate application programming interface (API) calls.

Referring to FIG. 1A, each service account 112 includes one resource management agent 114 per resource type that needs to be monitored. The resource management agents 114 have an IAM role that allows access to only the resource type that it monitors or remediates. For example, if it is desired to prevent any unauthorized modifications to an EC2 security group, the IAM role associated with the corresponding resource management agent 114 is assigned 'read/write' access only to the EC2 security groups. More generally, the IAM role corresponding to a resource management agent is 'granular' in terms of the actions the resource management agent 114 is assigned to perform. The granularity, as used herein, provides isolation of responsibility for the compliance policies and helps contain a 'blast radius' in the event of a Distributed Denial-of-Service (DDoS) attack or unintended changes. The granularity also avoids consolidation of power into one particular drift detection service role, thus not making it the central target of a DDoS attack.

As is commonly known in computer networking art, the term 'blast radius' is used to define the reach that a faulty configuration change or a problem may cause. For example, if a change is made incorrectly to a firewall or router that prevents it passing traffic, the reach of the disruption caused and the impact on other network systems is commonly known as the blast radius. In the context of designing application delivery network designs, 'blast radius' is used to define where load balancers should be placed and associated with each application to segment the network and in order to reduce the impact of an issue that may compromise an application.

Referring back to FIG. 1A, the resource management agents 114 are provisioned such that the associated policy actions are determined by configuration files that are delivered through the source file repositories. Configuration files related to the resource management agents 114 may be provided in JavaScript Object Notation (JSON) format. Policy actions of the resource management agents 114 may include reverting changes in the source file as part of security drift mitigation strategies, and updating detection and remediation logs related to security drift events to a master service queue 108 for further processing.

Specifically, the account management 116 agents are configured to accept API calls from the corresponding drift detection component 106 and responsive to the API calls, trigger corresponding resource management agents 114. The resource management agents 114, responsive to the triggers from the account management agent 116, execute one or more drift remediation strategies with respect to the corresponding cloud infrastructure resources. The drift remediation strategies may include an exception handling strategy, an automatic remediation strategy, a manual remediation strategy, and a deactivation strategy, as will be explained in more details later.

The system 10 also includes a rules engine 120 communicatively coupled with the service accounts 112. The rules engine 120 is configured to implement the drift remediation strategies mentioned above, in response to any security drift event. The user-defined operating policies of rules engine 120 are described in a human-readable data-serialization language, as in YAML (YAML Ain't Markup Language) files, for example. The YAML files may be hosted on distributed version-controlled collaborative web-hosted platforms such as Git-Soma. There may be at least one YAML policy file per resource type being monitored. YAML policies are written in JSON format and may include several cloud server specific constructs.

In operation, the rules engine 120 instantiates at least one resource management agent 114 for every resource type that is monitored. Each security drift event, as detected by the rules engine 120, is considered as an event and a cloud server queue such as Amazon Simple Queue Service (SQS) or the like may be used as the master service queue 108 for serializing and prioritizing drift detection events for further processing. IAM policies associated with the master service queue 108 permit the rules engine 120 and the resource management agents 114 across all service accounts 112 to send messages related to the security drift events to the queue 108. The messages related to the security drift events, as posted in the master service queue 108, are processed by the drift detection component 106 running in the same account as the master service queue 108. The length of a typical master service queue 108 is typically configured taking into consideration the number of service accounts 112 being served and several related performance criteria, such as test scalability, resiliency, and explicit message deletion capacity.

The IAM policies related to the resource management agents 114, the account management agent 116 and other components are commonly protected from deletion or modification by including them in appropriate permission boundaries. The public cloud server policies that execute rules engine 120 in the service accounts commonly follow the 'least privilege' principle and may require a policy with a minimal set of permissions. As is commonly known in the art, the 'least privilege' principle requires that only the minimum necessary rights be assigned to an object that requests access to a resource and, in effect, be for the shortest duration necessary. Put in another way, granting permissions to a user beyond the scope of the necessary rights of an action may allow that user to obtain or change information in unwanted ways. Therefore, careful delegation of access rights may limit potential DDoS attackers from damaging a system. Typically, a public cloud account provisioning team may help deploy infrastructure resources across all public cloud accounts. In particular, the provisioning team may help deploy the resource management agents 114, the account management agents 116 of the present disclosure, and the IAM policies and the event triggers 146 related to the resource management agents 114 and the account management agents 116.

Referring back to FIG. 1A, the drift detection component 106 monitors the master service queue 108 in the master account 104 and processes new security drift events coming into the master service queue 108. Specifically, the drift detection component 106 may consider all source files corresponding to exception situations and critical emergency scenarios (also referred to as "break-fix" or "break-glass" scenarios) and decides the remediation strategy for a security drift event. In other words, the drift detection component 106 determines whether a particular event is authorized or not, whether an exception exists for it, whether it is already auto-remediated or needs manual remediation and the like, depending on the rules engine 120 policies. The status and outcome information related to the security drift event, as detected by the drift detection component 106 are stored as state information and exported forward onto a global service queue, as described below.

The monitoring and remediating system 10 of FIG. 1A includes a global account 122 that includes a drift reporting component 124. The drift reporting component 124 reads the states of the security drift events across all client account clusters 102. The drift reporting component 124 is configured to collect drift detection data from the drift detection components 106, and map the drift detection data to corresponding security breaching entities. The global account 122 also includes a global service queue 126, which may have 'write-only' access from the master accounts 104 of the client account clusters 102. The messages coming into the global service queue 126 may be encrypted by customer-administered cryptographic keys and locally monitored so that threats such as Distributed Denial-of-Service (DDoS) attacks may be recognized and prevented.

Figure 1B:
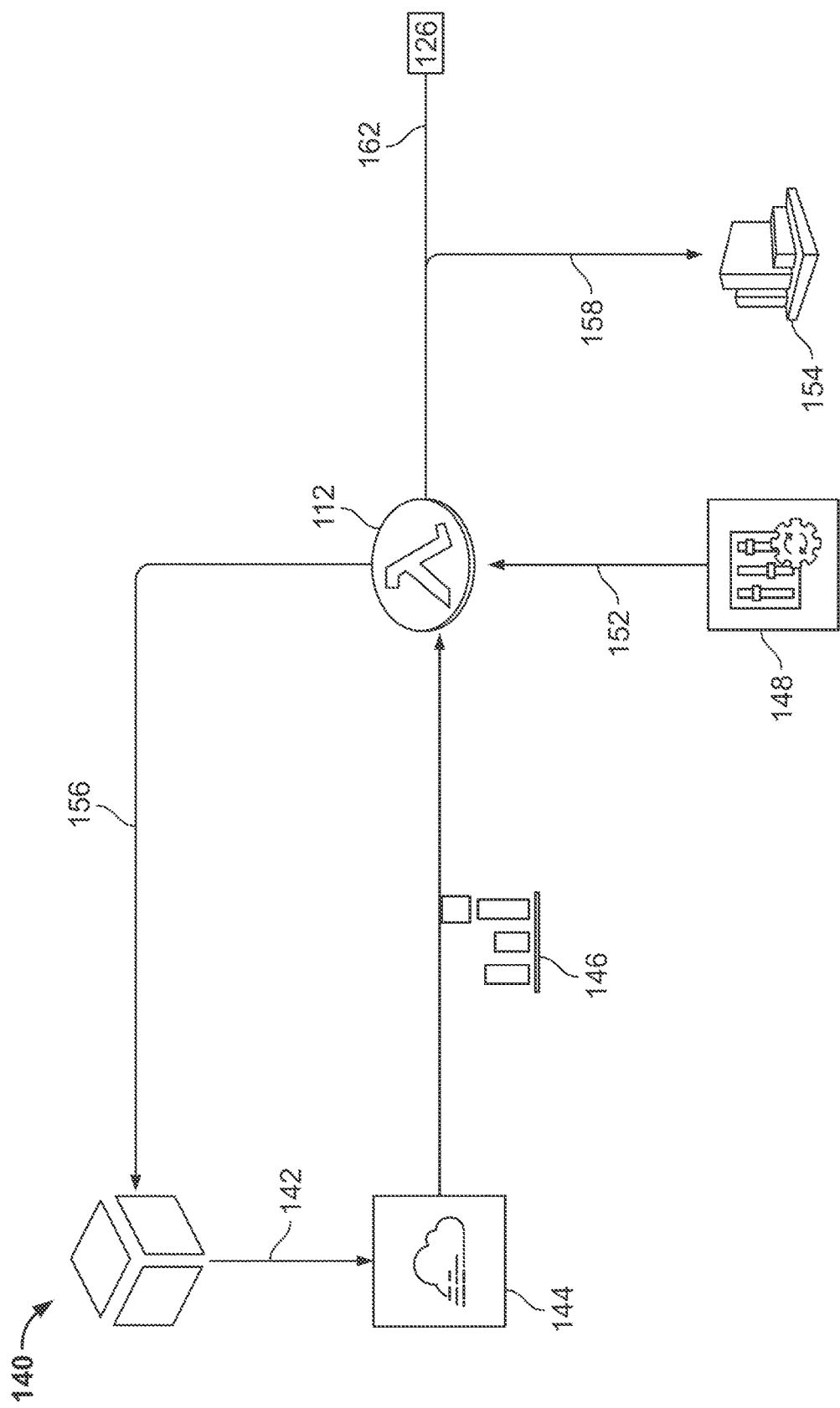
FIG. 1B is a block diagram illustrating an example logic flow for monitoring and remediating security drift events in a public cloud network, as described with respect to the system of FIG. 1A.
Figure 1C:
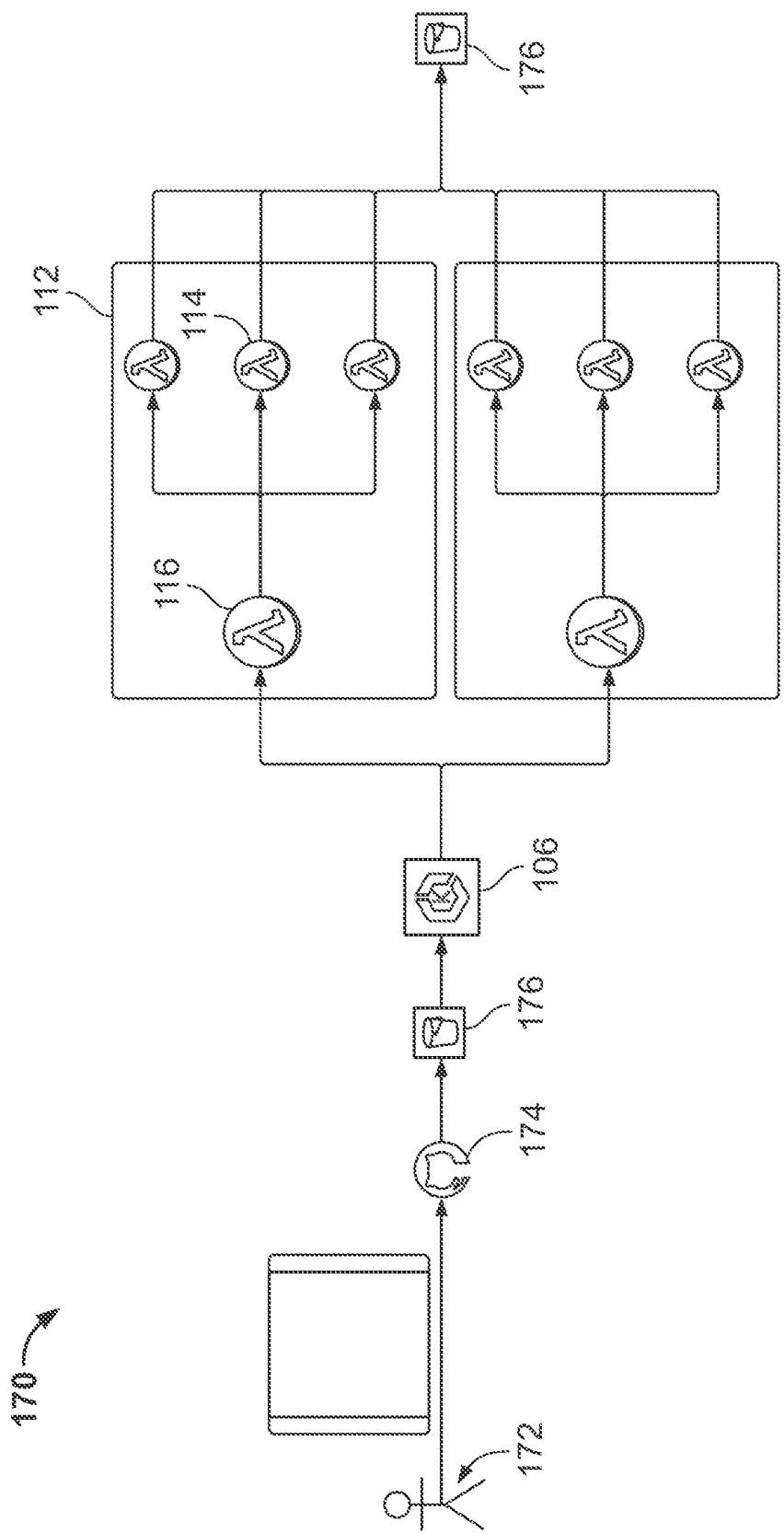
FIG. 1C is a block diagram illustrating an example logic flow for creating security drift exceptions in a public cloud network, as described with respect to the system of FIG. 1A.
Figure 1D:
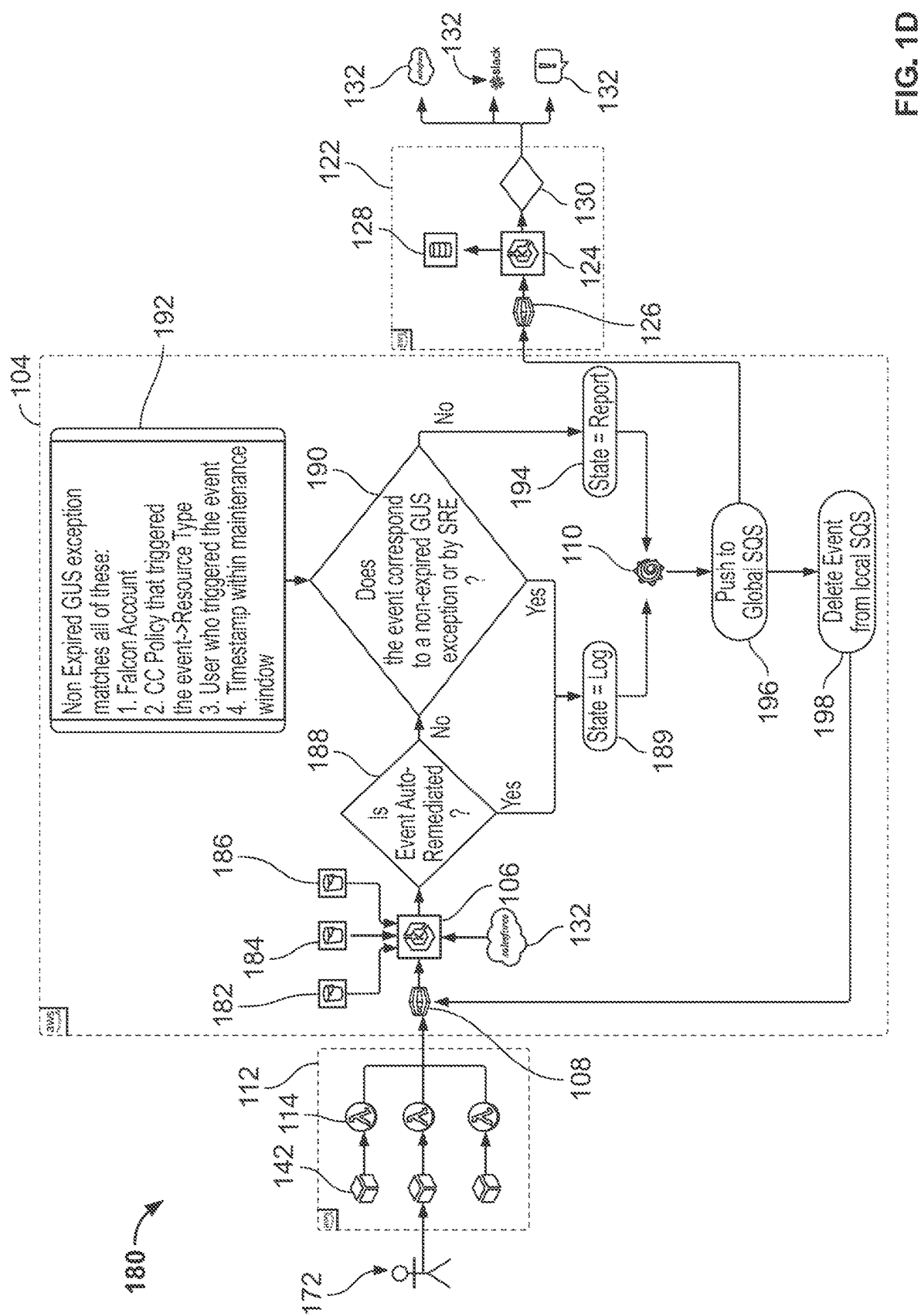
FIG. 1D is a block diagram illustrating an example logic flow for addressing security drift exceptions in a public cloud network, as described with respect to the system of FIG. 1A.

In operation, the resource management agents 114 are governed by the latest configuration files stored in designated source file repositories (FIG. 1D, 182, 186). The drift detection component 106 in the master account 104 detects changes in configuration files and queries the rules engine 120 for appropriate drift remediation policy files. The rules engine 120 policy files are usually provided in JSON (JavaScript Object Notation) format, stored in policy file repositories (FIG. 1D, 184) and relate to one or more account management agents 116 and one or more resource management agents 114. Subsequently, the drift detection component 106 invokes the account management agent 116 that relate to the changes in the source files. The account management agent 116, in turn, internally triggers the corresponding resource management agents 114 that relate to the changes in the source files. The distributed control flow from the drift detection component 106 to the account management agent 116 to the resource management agents 114 is helpful in controlling the changes related to the resource management agents 114 in case of future releases, updates, bug fixes and staggered rollouts. The control flow is further utilized for providing maintenance windows in exception handling, break fixes and break glass scenarios.

Further, the drift detection component 106, operating for the entire client account clusters 102, publishes the state information related to the security drift events to the global service queue 126. The drift reporting component 124 collates the state information, stores them in a relational database system (RDS) 128, notifies the user and control owner via communication channels 132, creates drift remedial tickets against violators, and reports via a user interface. The communication channels 132 may include an email system, an instant messaging program such as Slack, alerts via Global Operations Console (GOC++) 132 and the like.

There may be security policies that are defined by designated security teams or policy owners for the respective resources and the state information related to the security drift events may include information regarding the specific security policies that may have been violated and that may have triggered the security drift events. In an embodiment, the drift detection component 106 may assign risk levels, such as 'low', 'medium', 'critical', and the like to the security drift events. The risk levels may be assigned by evaluating several factors, such as the environment in which the violation occurred, the predefined risk level associated with every security policy, and the like.

The cloud native services utilized by rules engine 120 per service account, their purpose and permissions may be implemented as described below. As used herein, administrator-defined IAM policies are used to list account aliases and to check for the users' identities. The master service queue 108 and the global service queue 126 are queuing events corresponding to the master account 104 and the global account 122, respectively, for notifications and centralized logging with appropriate permission for sending messages. Source files related to the resources managed and rules engine 120 policy files are stored in the source file repositories (FIG. 1D, 182, 184, 186) in the client account cluster 102 and are used to read the latest versions of the corresponding files.

FIG. 1B is a block diagram illustrating an example logic flow 140 for monitoring and remediating security drift events in a public cloud server network, as described with respect to the system of FIG. 1A. Operating policies related to the rules engine 120 (of FIG. 1A) and the logic flow 140 are configured around deployment and utilization of several cloud server resources 142, such as Elastic Compute Cloud (EC2) instances, security groups, ingress-egress rules, network access control lists (ACL) and the like. The resources 142 are continuously or periodically monitored, and changes are detected in near real time and conditionally reverted back. Further, the changes in the resources 142 and their remedial measures are granular, i.e., specific to actions on the particular resource type.

Referring to FIG. 1B, the logic flow 140 includes a cloud server drift trailing component 144 that operates as a data source over the entire range of cloud server services. Specifically, the rules engine 120 tracks the changes in a resource management agent 114 and is triggered by several events detected by the drift trailing component 144. The drift trailing component 144 effectuates change remediation policies related to the resource management agents 114, as soon as the security drift events occur. Further, the drift trailing component 144 provides an event history of all cloud server account activities, including actions taken through a cloud server management console, cloud server software development kits (SDK), command line tools, and other public cloud server services.

The logic flow 140 includes a trigger 146 that generates an event that detects, remediates and logs security drift events. For example, an action by a user outside of an authorized zone such as the IAC (Infrastructure as Code) channels is considered as unauthorized (except for break-glass scenarios). Such unauthorized actions may be performed externally via a cloud server management console or a cloud server user interface. The unauthorized actions trigger a chain of events and actions by the rules engine 120 infrastructure set up on the relevant service accounts.

Referring again to FIG. 1B, the logic flow 140 further includes cloud server configuration files 148 that provide a detailed information about the configuration of the cloud server resources 142 in the cloud server accounts 112. The information include how the resources 142 are related to one another and how they have been configured in the past so that changes in the configuration states 152 and relationships can be detected over time. The rules engine 120 uses the configuration states 152 and relationships to revert back any unauthorized changes in the resource management agents 114 to its previous or a predetermined intended state.

The logic flow 140 further includes cloud server drift tracking components 154 that typically create local log trails of the resource management agent 114 execution. The drift tracking components 154 are deployed to monitor event logs and they typically come into operation when the resource management agent 114 function completes processing a security drift event, and logs metrics about the security drift event to the drift tracking component 154 as a log stream.

In operation, cloud server resource management agent 114 receives drift tracking events over drift trailing component API calls in real time or near real time, i.e., within a very short delay period. For example, the delay period may be ninety (90) seconds or less. Internally, the rules engine 120 reconstitutes the current state 152 for all the resources 142 in the event, executes the corresponding policies, matches the policy filters, and applies the policy actions to corresponding resources.

The infrastructure set up by rules engine 120 on the service accounts 112 includes event rules effectuated by the drift tracking component 154 configured to monitor particular events on a particular resource type in coordination with the drift trailing component 144, the resource management agent 114, and the event trigger 146. Specifically, the resource management agents 114 may invoke remediation actions based on the configurations provided by the cloud server configuration files 148.

The architecture of the rules engine 120, as exemplified in the logic flow 140, may be based on an event driven, reactive security model. The trigger 146 generates an event that detects, remediates and logs security drift events. There are at least three types of remediation strategies—auto-remediation, manual remediation and deactivation.

In case of auto-remediation, changes by unauthorized means or unauthorized users may be automatically reverted back as in 156 and a notification may be sent to an administrator. The auto-remediation strategy is applicable in instances where unintended changes to security groups are not permitted.

In case of manual remediation, changes are not automatically reverted, and they are addressed manually. An update to the monitored resource type shows up as an event in drift tracking component 154 log 158 and global log 162. Specifically, security drift remedial tickets may be created on the violators and notifications may be sent to an administrator. Manual remediation strategies are applicable in instances where the resources 142 may contain production data and they are not to be deleted.

In case of deactivation remediation, the drift detection component 106 may invoke the account management agent 116 with a 'deactivate' mode for a specific resource management agent 114. The account management agent 116, in response, invokes a disable-rule cloud server-specific API on the resource management agent 114. Conversely, when needed, the disable-rule may be revoked and an enable-rule may be invoked by setting the mode as either auto-activation or manual activation. Additionally, a 'hard delete' option may be executed through appropriate PCS pipelines to deactivate a resource management agent 114.

Referring to FIGS. 1A and 1B, the security drift monitoring and reporting system 10 may be structured into at least three levels of aggregation. In this example, at a first level, the serverless components 114 and 116 are integrated with the third party open-source rules engine 120. At a second level, the serverless application components 114 and 116 are supervised by the designated drift detection components 106 deployed through the cloud client accounts 102 in a distributed architecture. At a third level, the globally instantiated drift reporting component 124 collects all drift detection data from the drift detection components 106 and aggregates the data for global reporting resulting in appropriate remedial actions.

The distributed architecture of the system 10 results in decoupling of the security drift detection function as performed by the drift detection component 106 and the security drift reporting function as performed by the drift reporting component 124. Further, the serverless application components 114 and 116 operate with a 'least privilege' principle. Appropriate permissions specify policies that govern changes in the corresponding cloud infrastructure resources. The drift detection component 106 confines a drift radius of a security drift event to the corresponding client account cluster 102, granularizes a drift remediation strategy to a specific service account 112, and localizes a drift remediation action to a specific cloud infrastructure resource 142. Further, each resource 142 is operationally isolated within a service account 112, and viewing from a security standpoint, the blast radius is limited only to the specific service account 112. Additionally, the IAM policies are such that the blast radius of a DDoS attack or an unintended change is limited only to a specific client account cluster 102.

FIG. 1C is a block diagram illustrating an example logic flow 170 for creating security drift exceptions in a public cloud network, as described with respect to the system of FIG. 1A. Referring to FIG. 1C, an account owner or policy owner 172 may create an exception by registering a change in a policy file stored in a policy repository (PR) 174. The policy repository 174 is communicatively coupled with a source file repository 176. The exception typically includes information on cloud server targets and the accepted reference values are account identification number, client account cluster name, domain name, rules engine policy that needs exception, users that need exception, a maintenance window with valid start and end times within which changes will be allowed by the system and the like. Acceptable modes of execution for addressing the exceptions may be manual or deactivation. Manual remediation may be requested by service owners. Deactivation remediation may be requested by site reliability engineers (SRE) and system administrators for break-glass events. The remediation policies are commonly delivered into the policy repositories 174 by cloud asset management services such as Firefly for Amazon Web Services (AWS).

Referring to FIG. 1C, the drift detection component 106 periodically checks for open exceptions from the source file repository 176 and saves it into a local cache (not shown). The drift detection component 106 subsequently deploys the changes by invoking the account management agent 116 that relates to the changes in the source files. The account management agent 116, in turn, internally triggers the corresponding resource management agents 114 that relate to the changes in the source files. Responses of the resource management agents 114 depend on the specific remediation mode effectuated by the rules engine 120. Once an exception, created and registered in a policy repository 174, is approved by the rules engine 120 policy owner, and optionally the security drift monitoring team, the exception is merged with the source file repository 176.

FIG. 1D is a block diagram illustrating an example logic flow 180 for addressing security drift exceptions in a public cloud network, as described with respect to the system of FIG. 1A. A user 172 may change a cloud server resource 142 that is being monitored. There are several possibilities that are considered at this point. If, for example, the user 172 opens an exception for a resource 142 and changes the resource 142 within its maintenance window, the change action may be permitted. If, on the other hand, the user 172 opens an exception for a resource 142 and changes another resource within the maintenance window, the change action may not be permitted. If, the user 172 opens an exception for a resource 142 and changes the resource 142 outside its maintenance window, the change action may not be permitted. If the user 172 opens an exception for a resource 142 but another user changes the resource 142 within the maintenance window, the change action may not be permitted. The drift detection component 106, monitoring the entire client account clusters 102, processes the user and exception information, and publishes the state of the event to the global service queue 126 (FIG. 1A). The drift reporting component 124 processes the messages in the global service queue 126 and creates drift remedial tickets against violating teams.

In an embodiment, the security drift exceptions may be stored in an exception repository 182, the rules engine 120 policy files may be included in a policy file repository 184. As an alternate design consideration, the system may further include an alternate hydrated (i.e. with all data imported into respective objects) source file repository 186.

For any violations of policies that are not in auto-remediation mode or given exceptions, drift remedial tickets may be created against the violator. The master account queue 108 or the global account queue 126 provides information on the account that violated the policy. The violating account number may be cross-referenced with the alternate hydrated source file repository 186 to acquire relevant service registration information, such as service name, product tag, service owners. The service registration information may be used to create drift remedial tickets. The drift detection component 106 may maintain a local cache of drift remedial tickets created previously and update any unresolved drift remedial tickets with changes to avoid duplication or redundancy.

Referring to FIG. 1D, in operation, when a user 172 changes a resource 142 that is associated with a resource management agents 114, the change is detected by the drift detection component 106 as a security drift event. The drift detection component 106 may compare the security drift event with the database of exceptions 182 and/or the rules engine policies stored in the policy repository 184 and/or the hydrated source file repository 186. The drift detection component 106 first proceeds to a decision checkpoint 188 and checks whether the security drift event is to be auto-remediated or not. If the outcome is 'yes', the decision check proceeds to an action of logging a report, as in 189. On the other hand, if the outcome of the decision checkpoint 188 is 'no', the decision check proceeds to the second decision checkpoint 190.

At the second decision checkpoint 190, input information 192 is received on whether the event corresponds to a non-expired drift remedial ticketed exception, whether the event is by newly created by a site reliability engineers (SRE), whether the non-expired drift remedial ticketed exception matches several conditions, such as being associated with a specific cloud server account, with a rules engine policy that triggered the drift event, with the resource type, with the specific user who triggered the event, and with the specific timestamp within the maintenance window and the like.

Returning to the decision checkpoint 190, if the outcome is 'yes', the decision check proceeds to an action of logging, as in step 189. If the outcome is 'no', the decision check proceeds to an action of reporting, as in step 194. The logs of step 189 and the reports of step 194 may be performed at an exception point, such as Grafana or Argus, at 110. Subsequently, the security drift event, with its state information, is pushed to a global queue such as 126, as in step 196. At the same time, the security drift event is deleted from a local queue such as the master account queue 108, as in step 198. The global queue 126 completes the exception handling process as described above, in relation to FIG. 1A.

Specifically, the drift reporting component 124 may collate the state information, store in a relational database system (RDS) 128, notify the users and the control owners via communication channels 132, create drift remedial tickets against violators, and report via a user interface. The communication channels 132 may include an email system, an instant messaging program such as Slack, alerts via Global Operations Console (GOC++) 132 and the like. In an instance, risk levels such as, 'low', 'medium', 'critical' may be assigned to the security drift events being processed in the global service queue 126.

In an embodiment, the monitoring and remediating system 10 of FIG. 1A may be a learning-based remediation system configured to adapt and make future decisions based on past actions taken for remediations and other indicators. The past actions may be one or more of auto remediation, adding an exception, and adding a configuration policy to remove the exception in compliance with Infrastructure as Code (IAC) practices. In this embodiment, the learning-based remediation system 10 may have four main components that work in tandem and implement a learning-based remediation model and maintain a number of operational metrics above respective threshold measures.

First, there may be a workflow engine that automates and manages the process of identifying and resolving security drift incidents. Functions of the workflow engine may include tasks such as detecting drift, notifying service owners, tracking progress, and implementing remediation actions.

Further, there may be an action flow database that stores information about the actions and reactions of users and systems in response to security drift events. The stored information may include details about the drift event, such as the specific security rule that was violated, as well as information about the actions taken by users and systems in response to the event, such as the resolution of a ticket or the creation of a new security rule.

The system may also include a correlation engine that is used to analyze and correlate data from various sources, such as log files, network traffic, and system configurations, in order to detect and identify security threats or anomalies.

The system may further include a learning engine that helps the system learn from past actions based on a learning algorithm and adapt to new situations. The learning algorithm may include at least one of a supervised learning, unsupervised learning, semi-supervised learning, reinforcement learning, machine learning, and anomaly detection.

The learning-based remediation system 10 of this embodiment may learn and act based on action flow data from different environments, such as "development", "testing", "performance", "staging" and "production". Further, the workflow engine, the action flow database, the correlation engine, and the learning engine collaborate with each other and maintain a number of operational metrics, such as a number of false positives and snowflake configurations, and overall availability, above respective threshold measures.

As is commonly known in security monitoring and remediation art, a "false positive" is an instance where a security system detects and flags a potential violation or drift, but upon further investigation it is determined that the detected event is not actually a violation or drift. It is a false alarm, and no action needs to be taken. This may occur due to system errors, configuration mistakes, or other factors that cause the security system to misidentify normal behavior as a violation. False positives often lead to wasted time and resources, and may also undermine the credibility of the security system if they occur frequently.

A "snowflake configuration" refers to the scenario where the configuration of a server changes during its operation, resulting in a unique and hard to replicate configuration, just like a snowflake. A Snowflake configuration may happen due to manual changes made by an administrator, or due to automated processes that change the server's configuration.

Figure 2A:
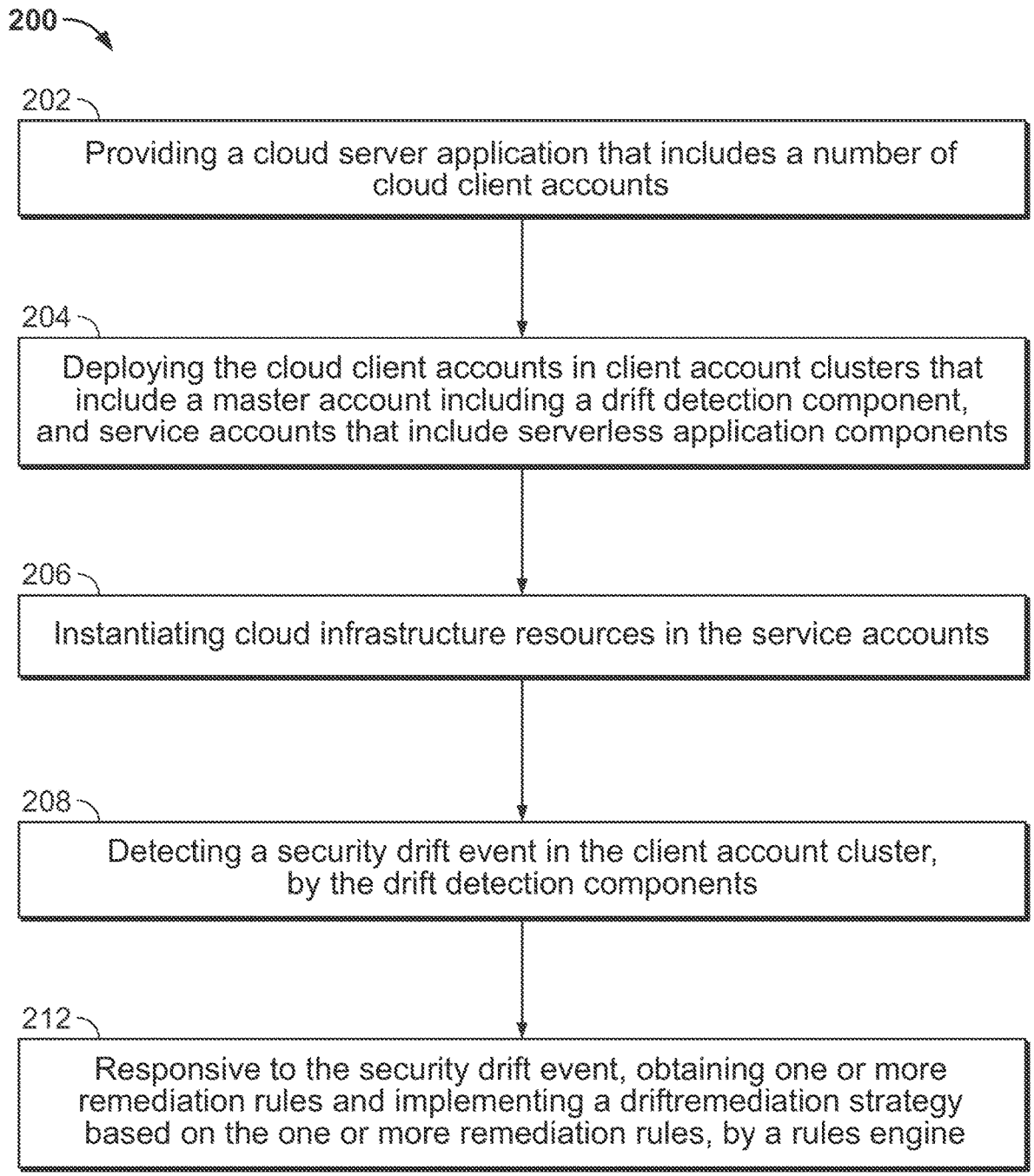
FIG. 2A is a flow diagram illustrating a method for monitoring and remediating security drift events in a public cloud network.
Figure 3A:
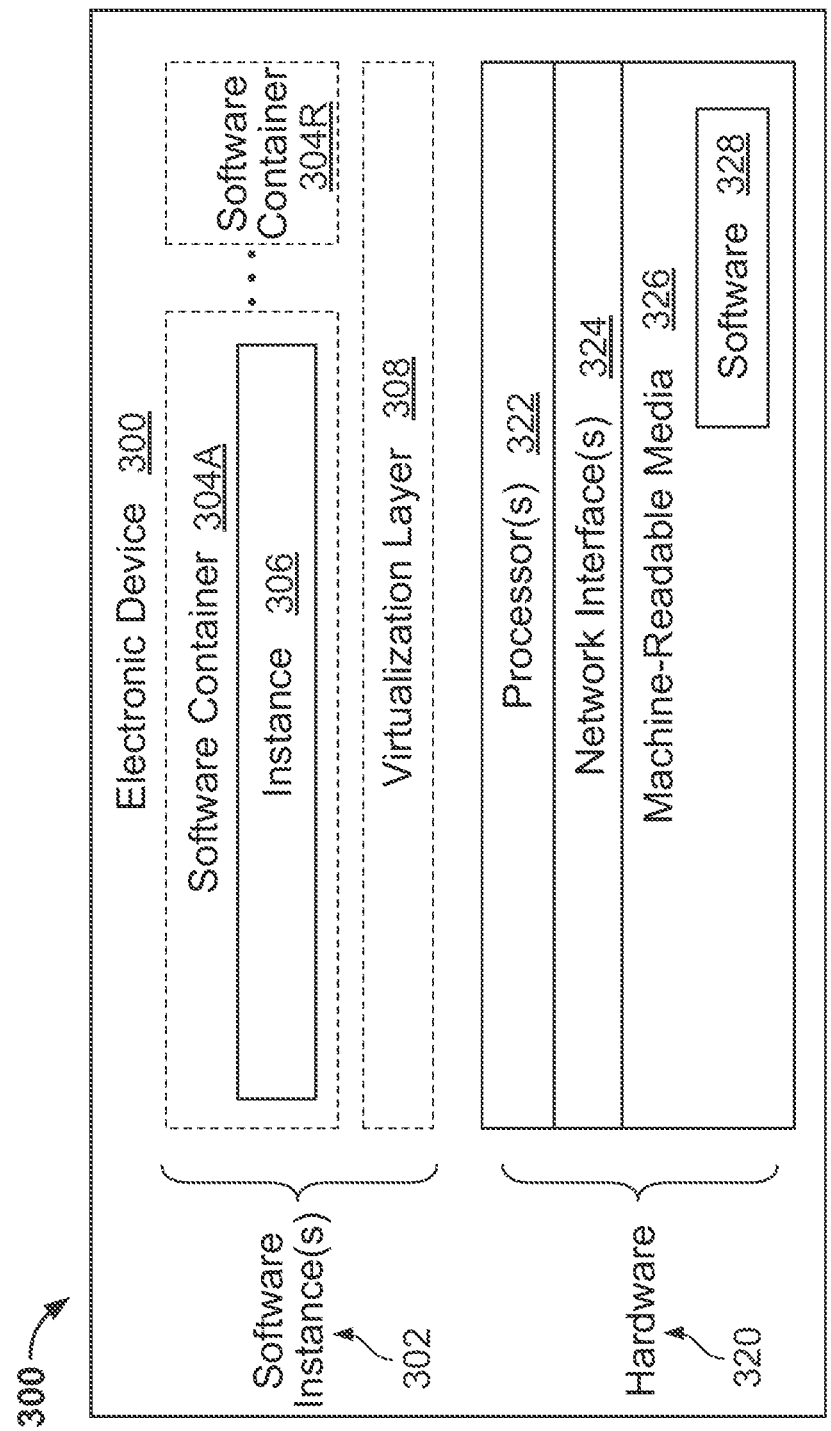
FIG. 3A is a block diagram illustrating an exemplary electronic device according to an example implementation.
Figure 3B:
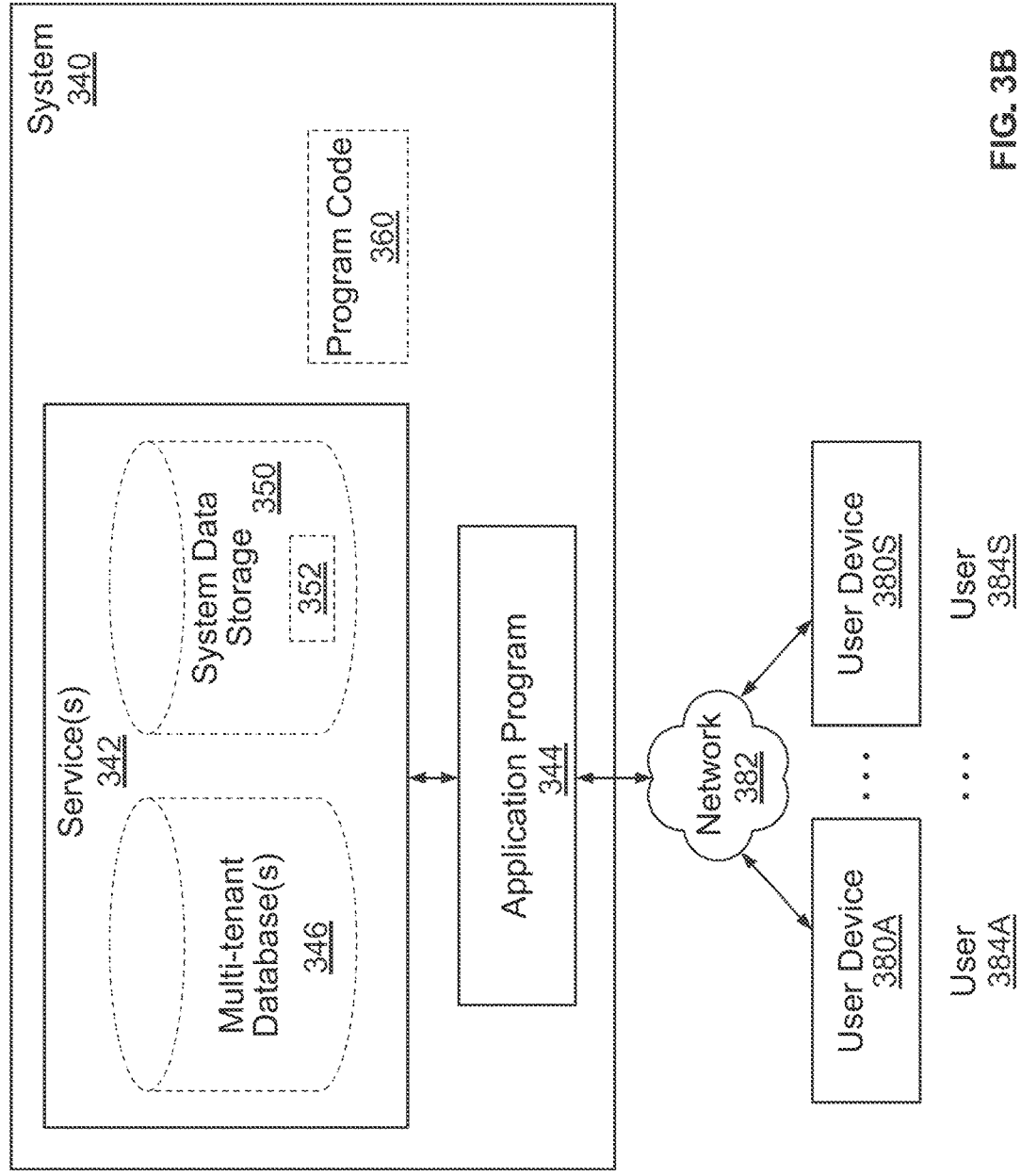
FIG. 3B is a block diagram of an exemplary deployment environment according to an example implementation.

FIG. 2A is a flow diagram illustrating a computer-implemented method 200 for monitoring and remediating security drift in a public cloud network, as disclosed herein. The method 200 may be performed, for example, by a system as shown in FIGS. 1A to 1D operating in conjunction with the hardware as shown in FIGS. 3A and 3B and/or by software executing on a server or distributed computing platform. Although the steps of method 200 are presented in a particular order, this is only for simplicity.

The computer-implemented method 200 may include, as in step 202, providing a cloud server application including a number of cloud client accounts. At 204, the cloud client accounts are deployed in a number of client account clusters. The client account clusters include a master account including a drift detection component, and a number of service accounts including serverless application components. At 206, a number of cloud infrastructure resources are instantiated in the service accounts. At 208, security drift events in the client account cluster are detected by the drift detection components. At 212, responsive to the security drift event, one or more remediation rules are obtained and a drift remediation strategy implemented by a rules engine based on the one or more remediation rules.

FIG. 2B is a flow diagram illustrating a computer-implemented method 200 for monitoring and remediating security drift in a public cloud network, as disclosed herein. At 214, a global account including a drift reporting component is provided. At 216, the drift reporting component collects drift detection data across the client account clusters from the corresponding drift detection components. At 218, the drift reporting component maps the drift detection data to corresponding security breaching entities.

At 222, a serverless component in the service accounts is configured as an account management agent. At 224, a number of serverless components in the service accounts are configured as resource management agents. At 226, API calls from the corresponding drift detection component are accepted by the account management agent, and responsive to the API calls, corresponding resource management agents are triggered. At 228, responsive to the triggers from the account management agent, one or more drift remediation strategies are executed with respect to the corresponding cloud infrastructure resources. The drift remediation strategies include at least one of an exception handling strategy, an automatic remediation strategy, a manual remediation strategy, and a deactivation strategy.

The computer-implemented method may include operating the serverless components with least privilege permissions specifying policies that govern changes in the corresponding cloud infrastructure resources, confining, by the drift detection component, a drift radius of a security drift event to the corresponding client account cluster. The computer-implemented method may also include granularizing, by the drift detection component, a drift remediation strategy to a specific service account. The computer-implemented method may further include localizing, by the drift detection component, a drift remediation to a specific cloud infrastructure resource.

The lift-and-shift architecture of the present disclosure may not require significant application-level changes during migration, because it is possible to rehost the applications across multiple environments built over multiple substrates, such as AWS, GCP, Azure, and the like. Further, implementation of the security and compliance policies may be simple with this architecture, because an implementer may repurpose the controls that may be required for deploying the compute, storage, and network resources of the relevant substrates. Additionally, the lift-and-shift approach of the present disclosure may employ the same architectural constructs even after a migration from one substrate to another. As a result, significant changes may not be required in terms of the business processes associated with the applications as well as for monitoring and management of the related interfaces.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices. The term "consumer" refers to another computer service that is running the reusable software components of the system of FIG. 1.

FIG. 3A is a block diagram illustrating an electronic device 300 according to some example implementations. FIG. 3A includes hardware 320 including a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and server components may be implemented in one or more electronic devices 300. In one implementation: 1) each of the clients is implemented in a separate one of the electronic devices 300 (e.g., in end user devices where the software 328 represents the software to implement clients to interface directly and/or indirectly with server components (e.g., software 328 represents a web browser, a native client, a portal, a command-line interface, and/or an application programming interface (API) based upon protocols such as Simple Object Access Protocol (SOAP), Representational State Transfer (REST), etc.)); 2) server components is implemented in a separate set of one or more of the electronic devices 300 (e.g., a set of one or more server devices where the software 328 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including server components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer implemented method for monitoring and remediating security drift in a public cloud network, the method comprising:
    providing a cloud server application comprising a plurality of cloud client accounts;
    deploying the cloud client accounts in a plurality of client account clusters, wherein a client account cluster comprises a corresponding master account comprising a drift detection component;
    detecting by a first drift detection a security drift event comprising an unintended change to existing security controls;
    receiving, by a global account drift reporting component, notification of the security drift event and the unintended change to the existing security controls;
    identifying an unauthorized deployment responsible for the security drift event; and
    responsive to the security drift event:
    reverting the unauthorized deployment; and notifying an administrator associated with the first master account of the security drift event, the reverting, or a combination thereof.

2. The method of claim 1, further comprising:
providing the global account drift reporting component;
collecting, by the global account drift reporting component, drift detection data across the client account clusters from the corresponding drift detection components; and
mapping, by the drift reporting component, the drift detection data to corresponding security breaching entities.

3. The method of claim 2, further comprising:
configuring a serverless component in a service account as an account management agent;
configuring a plurality of serverless components in a service account as resource management agents;
accepting API calls from the corresponding drift detection component, by the account management agent, and responsive to the API calls, triggering corresponding resource management agents;
responsive to the triggers from the account management agent, executing one or more drift remediation strategies with respect to the corresponding cloud infrastructure resources,
wherein the drift remediation strategies comprise at least one of an exception handling strategy, an automatic remediation strategy, a manual remediation strategy, and a deactivation strategy.

4. The method of claim 3 further comprising:
operating the serverless components with least privilege permissions specifying policies that govern changes in the corresponding cloud infrastructure resources;
confining, by the drift detection component, a drift radius of a security drift event to the corresponding client account cluster;
granularizing, by the drift detection component, a drift remediation strategy to a specific service account; and
localizing, by the drift detection component, a drift remediation to a specific cloud infrastructure resource.

5. A system for monitoring and remediating security drift in a public cloud network, the system comprising:
a computer processor;
a cloud server application digitally connected with the computer processor, the cloud server application comprising a plurality of cloud client accounts deployed in a plurality of client account clusters, wherein a client account cluster comprises a corresponding master account comprising a drift detection component;
a plurality of service accounts comprising serverless application components;
a non-transitory machine-readable storage medium that provides instructions that, when executed by the processor, are configurable to cause the system to perform operations comprising:
    detecting by a first drift detection component a security drift event comprising an unintended change to existing security controls;
    receiving, by a global account drift reporting component, notification of the security drift event and the unintended change to the existing security controls;
    identifying an unauthorized deployment responsible for the security drift event; and
    responsive to the security drift event:
    reverting the unauthorized deployment; and
    notifying an administrator associated with the first master account of the security drift event, the reverting, or a combination thereof.

6. The system of claim 5, the instructions further causing the processor to perform operations comprising:
providing the global account drift reporting component;
collecting, by the global account drift reporting component, drift detection data across the client account clusters from the corresponding drift detection components; and
mapping, by the drift reporting component, the drift detection data to corresponding security breaching entities.

7. The system of claim 6, the instructions further causing the processor to perform operations comprising:
configuring a serverless component in a service account as an account management agent;
configuring a plurality of serverless components in a service account as resource management agents;
accepting API calls from the corresponding drift detection component, by the account management agent, and responsive to the API calls, triggering corresponding resource management agents;
responsive to the triggers from the account management agent, executing one or more drift remediation strategies with respect to the corresponding cloud infrastructure resources,
wherein the drift remediation strategies comprise at least one of an exception handling strategy, an automatic remediation strategy, a manual remediation strategy, and a deactivation strategy.

8. The system of claim 7, the instructions further causing the processor to perform operations comprising:
operating the serverless components with least privilege permissions specifying policies that govern changes in the corresponding cloud infrastructure resources;
confining, by the drift detection component, a drift radius of a security drift event to the corresponding client account cluster;
granularizing, by the drift detection component, a drift remediation strategy to a specific service account; and
localizing, by the drift detection component, a drift remediation to a specific cloud infrastructure resource.

9. A non-transitory machine-readable storage medium that provides instructions that, if executed by a processor, are configurable to cause said processor to perform operations comprising:
providing a cloud server application comprising a plurality of cloud client accounts;
deploying the cloud client accounts in a plurality of client account clusters, wherein a client account cluster comprises a corresponding master account comprising a drift detection component;
detecting by a first drift detection a security drift event comprising an unintended change to existing security controls;
receiving, by a global account drift reporting component, notification of the security drift event and the unintended change to the existing security controls;
identifying an unauthorized deployment responsible for the security drift event; and
responsive to the security drift event:
reverting the unauthorized deployment; and
notifying an administrator associated with the first master account of the security drift event, the reverting, or a combination thereof.

10. The non-transitory machine-readable storage medium of claim 9, the operations further comprising:
providing the global account drift reporting component;
collecting, by the global account drift reporting component, drift detection data across the client account clusters from the corresponding drift detection components; and
mapping, by the drift reporting component, the drift detection data to corresponding security breaching entities.

11. The non-transitory machine-readable storage medium of claim 10, the operations further comprising:
configuring a serverless component in a service account as an account management agent;
configuring a plurality of serverless components in a service account as resource management agents;
accepting API calls from the corresponding drift detection component, by the account management agent, and responsive to the API calls, triggering corresponding resource management agents;
responsive to the triggers from the account management agent, executing one or more drift remediation strategies with respect to the corresponding cloud infrastructure resources,
wherein the drift remediation strategies comprise at least one of an exception handling strategy, an automatic remediation strategy, a manual remediation strategy, and a deactivation strategy.

12. The non-transitory machine-readable storage medium of claim 11, the operations further comprising:
operating the serverless components with least privilege permissions specifying policies that govern changes in the corresponding cloud infrastructure resources;
confining, by the drift detection component, a drift radius of a security drift event to the corresponding client account cluster;
granularizing, by the drift detection component, a drift remediation strategy to a specific service account; and
localizing, by the drift detection component, a drift remediation to a specific cloud infrastructure resource.

13. A system for monitoring and remediating security drift in a public cloud network, the system comprising:
a computer processor;
a cloud server application digitally connected with the computer processor, the cloud server application comprising a plurality of cloud client accounts deployed in a plurality of client account clusters, wherein a client account cluster comprises a corresponding drift detection component;
a plurality of service accounts comprising serverless application components;
a plurality of cloud infrastructure resources locally instantiated in the service accounts;
a global account drift reporting component configured to receive a notification of a security drift event comprising an unintended change to existing security controls; and
a rules engine configured to implement a drift remediation strategy comprising:
reverting the unauthorized deployment; and
notifying an administrator associated with a master account of the security drift event, the reverting, or a combination thereof.

14. The system of claim 13, the global account drift reporting component configured to collect drift detection data from the drift detection components, and map the drift detection data to corresponding security breaching entities.

15. The system of claim 14, wherein the serverless application components in a service account comprise an account management agent and a plurality of resource management agents, the account management agents configured to accept API calls from the corresponding the drift detection components and responsive to the API calls, trigger corresponding resource management agents, the resource management agents, responsive to the triggers from the account management agent, configured to execute one or more drift remediation strategies with respect to the corresponding cloud infrastructure resources, wherein the drift remediation strategies comprise at least one of an exception handling strategy, an automatic remediation strategy, a manual remediation strategy, and a deactivation strategy.

16. The system of claim 15, wherein the serverless application components operate with least privilege permissions specifying policies that govern changes in the corresponding cloud infrastructure resources, the drift detection component confines a drift radius of a security drift event to the corresponding client account cluster, granularizes a drift remediation strategy to a specific service account, and localizes a drift remediation to a specific cloud infrastructure resource.

* * * * *